Aug. 18, 1970   R. GERSBECK   3,524,219
FINISHING OF LAMINAR MATERIALS

Filed July 30, 1968   4 Sheets-Sheet 1

INVENTOR
ROLF GERSBECK
BY
Mason, Mason & Albright
ATTORNEYS

Aug. 18, 1970  R. GERSBECK  3,524,219
FINISHING OF LAMINAR MATERIALS
Filed July 30, 1968  4 Sheets-Sheet 2

INVENTOR
ROLF GERSBECK
BY
ATTORNEYS

Aug. 18, 1970 R. GERSBECK 3,524,219
FINISHING OF LAMINAR MATERIALS
Filed July 30, 1968 4 Sheets-Sheet 3

INVENTOR
ROLF GERSBECK
BY
Mason, Mason & Albright
ATTORNEYS

United States Patent Office 3,524,219
Patented Aug. 18, 1970

3,524,219
FINISHING OF LAMINAR MATERIALS
Rolf Gersbeck, Hannover, Germany, assignor to Hermann Berstorff Maschinenbau G.m.b.H., Hannover, Germany, a joint-stock company of Germany
Filed July 30, 1968, Ser. No. 748,843
Claims priority, application Germany, Apr. 4, 1968, 1,778,191
Int. Cl. B29c 15/00; B29d 29/00
U.S. Cl. 18—6       5 Claims

ABSTRACT OF THE DISCLOSURE

In plant for the finishing of laminar materials such as sheet plastics and rubber a wire mesh belt is provided having a finishing surface, for example of a closely woven material and this belt is arranged to apply pressure to the laminar material as both pass over a heated drum. The plant further includes a tension roller mounted in adjustable bearings and an electrical device is provided to vary the position of the adjustable bearings so that the tensioning roller shall run in operation in truly parallel relationship with the heating drum and any other rollers forming part of the plant.

Should an electrical signal be set up with indicates non-alignment of the tensioning roller hydraulic pressure is applied to a ram supporting one of the bearings of the tensioning roller thereby to correct the alignment.

BACKGROUND OF THE INVENTION

Plant for applying continuous finishing treatments to plastics, rubber and the like in the form of sheets, foils, strips and the like generally consists of a rotatable processing drum and of an endless pressure belt running round the drum to provide the pressure required for the working process. These flexible belts are made, in most cases, from high-grade stranded wire, the warp wires being held together by weft wires.

These belts are very expensive, especially as they often have to be specially faced, so as to give the weave a smooth surface. When in use, the belts are subjected to severe tension stress, partly because they are required to exert the highest possible surface pressure on the processing drum and partly because they are responsible for driving the processing drum, change-of-direction rollers and tensioning rollers.

It has been found in practice that the entire weave of such belts undergoes distortion, causing excessive stress on the weft wires in particular, which are then liable to snap, so that the warp wires and hence the weave as a whole are no longer held together. Moreover, the distortion destroys the facing material bonded to the weave, rendering the entire belt useless. Furthermore, the running of a belt that is distorted can be regulated only with difficulty, if at all, according to how badly it is distorted.

As a result of the continuous distortions, the belt becomes narrower in course of time, so that the run of material that is being processed can no longer be treated across its full width.

The cause of this distortion lies in the fact that the change-of-direction and/or tensioning rollers of the plant are not truly parallel to the processing drum. If, for example, the parallel positioning of these rollers should be upset by non-uniform pressure or any other factor, the length of the belt changes differently along each side so that the path followed by each side in relation to the other is altered. These differences, small in themselves, lead to distortion of the weave and hence to premature breakdown of the belt, due to the consequent over-stressing of the weft wires.

SUMMARY OF THE INVENTION

The object of the invention is to improve the plant of which the belt forms part in such a way that any unequal length variations along the two sides of the belt are automatically at least partially offset directly they occur, by appropriate shifting of the tensioning roller. This it achieves by virtue of the fact that each bearing is associated with a variable resistor, one of which resistors supplies the normal voltage and the other the actual voltage, corresponding respectively to the normal and actual positions of the bearings, and that the difference between these voltages is fed to a regulator, which, according to the polarity of this voltage difference, changes over a distribution valve, which is acted upon by a fluid under pressure and is associated with one of the bearings, either to the "through" or the "vent" position, so that fluid under pressure is either fed through that distribution valve to the cylinder of a ram acting on that bearing or vented from that cylinder.

Another feature of the invention is that each variable resistor is connected to a pinion in mesh with a feeler rigid with a toothed rack and the bearings are each provided with a stop acting on the feeler appropriate thereto.

Each of the variable resistors is preferably fitted to the stand which carries the two bearings.

In accordance with another feature of the invention, each variable resistor is provided by way of precaution with a limit switch, which reduces the hydraulic pressure when a pre-determined extreme position of the variable resistor slide is reached.

The device in accordance with the invention ensures, irrespective of the load at any given moment, that the tensioning roller occupies a very definite position in relation to the processing roller and that the warp wires in the belt are evenly stressed across the entire width of the latter and along both sides thereof. This in turn ensures that the weft wires remain at right angles to the warp wires.

BRIEF DESCRIPTION OF DRAWINGS

FIG. 1 shows a tensioned belt consisting of a woven fibre part 1, in which are imbedded warp wires 2 and weft wires 3. In the normal condition, the weft wires 3 are at right angles to the warp wires 2.

Figure 1:
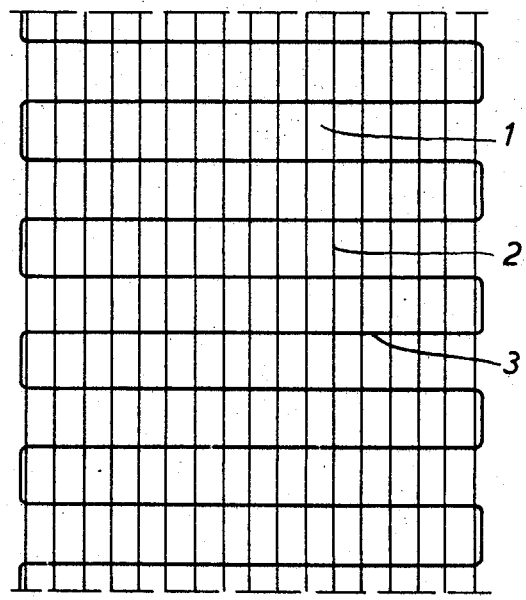
FIG. 1 is a plan of the tensioned belt, the device for maintaining correct tension in the belt being in its normal condition.
Figure 2:
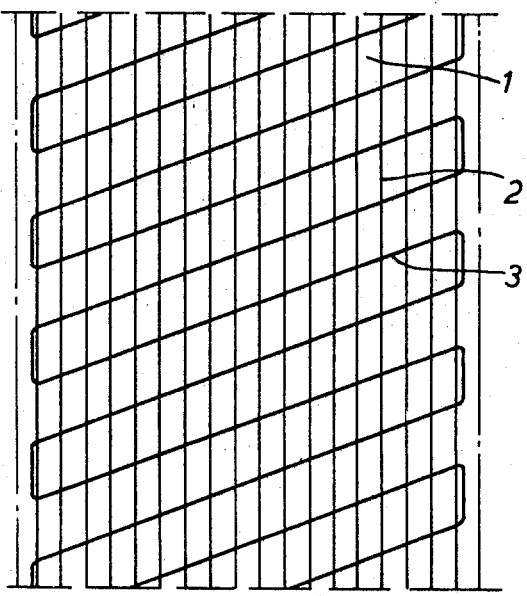
FIG. 2 is a plan of the tensioned belt, the device having been run in a distorted condition.

Should the belt be run for long periods while distorted the result is as shown in FIG. 2. Because of the inclined position of the weft wires 3, the belt has narrowed considerably in consequence of the "give" in the stranded warp wires 2. Once this narrowing process has advanced beyond a certain stage, undue stress is imposed on the weft wire 3. This leads to their breaking, the consequence of which is the destruction of the expensive woven belt 1.

Figure 3:
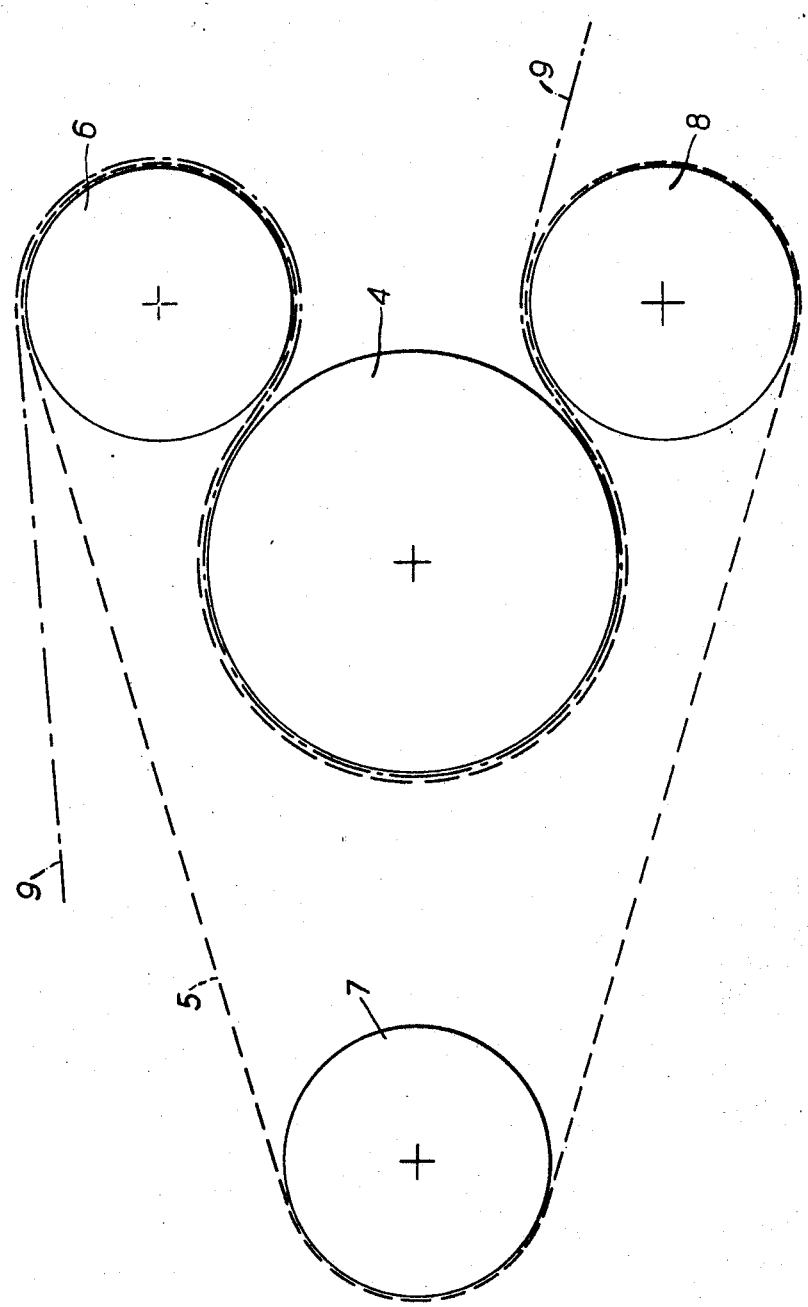
FIG. 3 is an end view of a heating drum around which the tensioned belt runs, as well as a tensioning roller and change-of-direction rollers of the device.

FIG. 3 shows a rotary heating drum 4, which can be maintained at a given temperature by appropriate heating means. The tensioned belt 5, formed by the woven part 1 and the warp and weft wires 2 and 3, passes most of the way round the periphery of the rotary heating drum 4. The belt runs as a continuous belt from the heating drum 4 round the direction changing roller 6 to the tensioning roller 7, then to the other direction changing roller 8, which returns it to the heating drum 4. The purpose of the belt 5 is to press the sheet or foil 9 onto the heating drum 4, so as to ensure good heat transmission.

Figure 4:
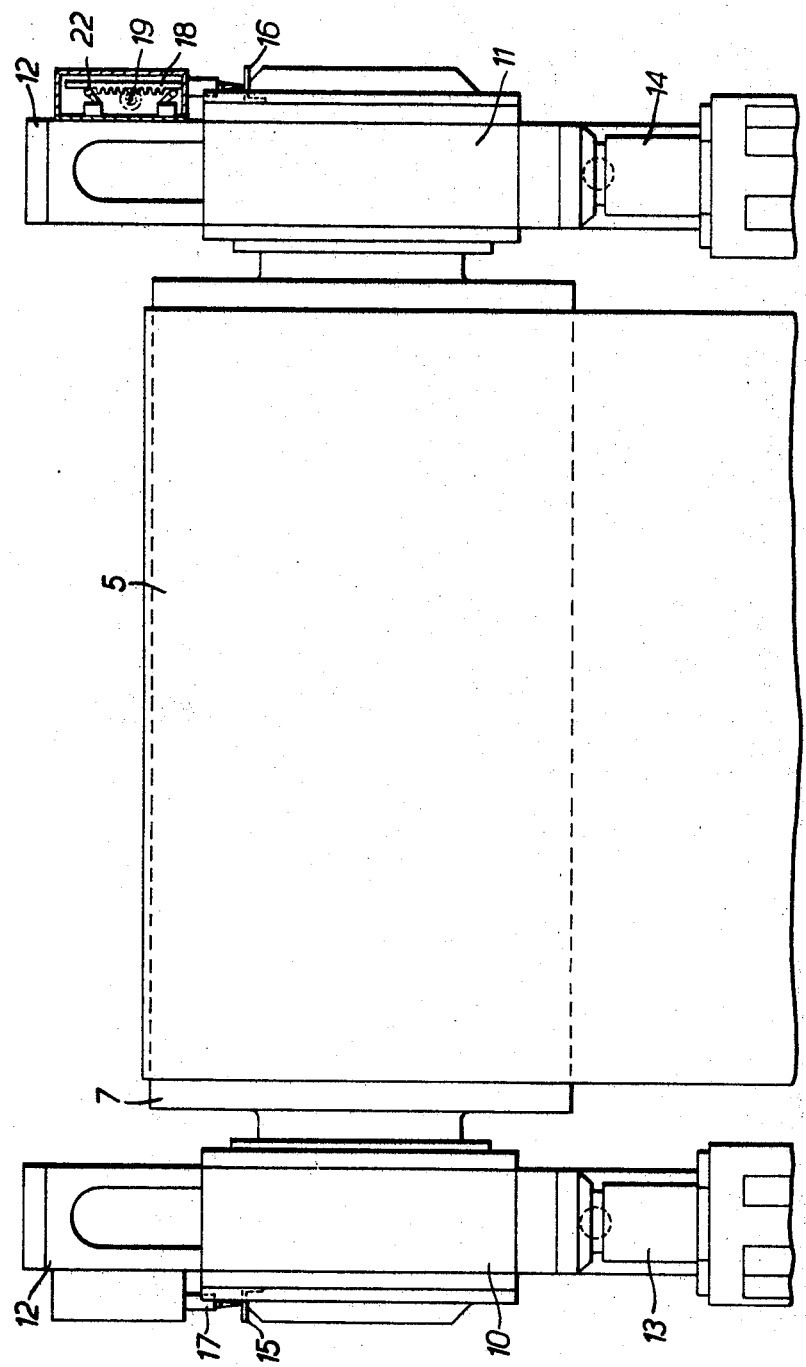
FIG. 4 is a plane of part of the device.

FIG. 4 shows the tensioning roller 7, around which the belt 5 passes. This tensioning roller 7 is journalled in bearings 10 and 11, which have freedom to slide in the machine frame 12. Movement is imparted to the tensioning roller 7, at right angles to its shaft, by rams 13 and 14.

Associated with the bearings 10 and 11 are stops 15 and 16 respectively, which act on feelers 17 and 18 respectively, a part of each of which has the form of a toothed rack.

Figure 5:
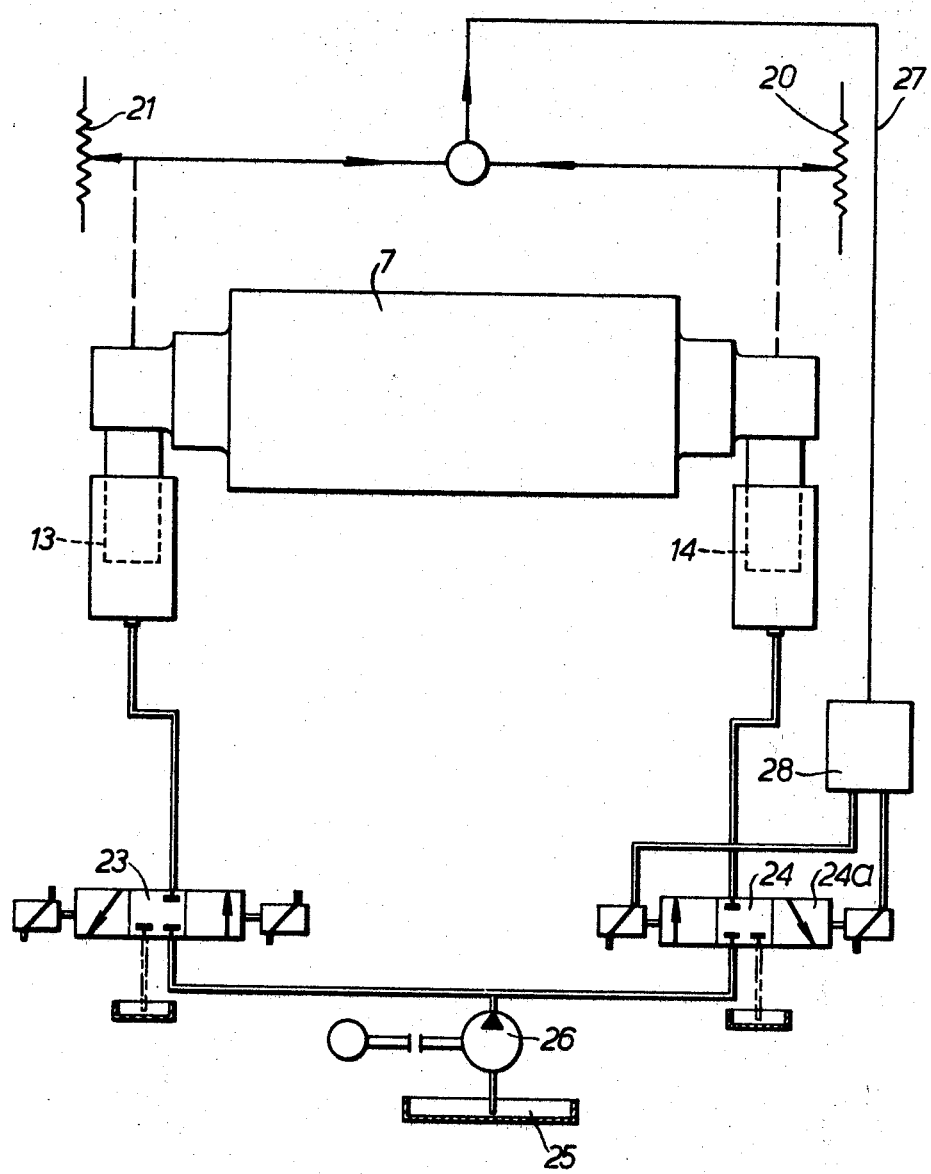
FIG. 5 is the hydraulic and electrical circuit diagram of the device.

In mesh with each of the rack of the feelers 17 and 18 is a pinion 19 for example, which is connected to a variable resistor 20, indicated purely diagrammatically in FIG. 5. The other variable resistor connected to the pinion (not shown) in mesh with the rack of the feeler 17, is referenced 21.

Current is supplied to the two variable resistors 20 and 21, the output voltage of either of them for any given position of the resistor slide being well defined.

FIG. 4 shows a limit switch 22, which reduces the hydraulic pressure when a predetermined limit position of the variable resistor 20 is reached.

The mode of operation of the device in accordance with the invention will now be described with reference to FIG. 5.

In the normal position, that is to say with the heating drum 4 and the tensioning roller 7 parallel to each other, the various parts occupy the positions shown in FIG. 5. Two hydraulic distribution valves 23 and 24 are then in a position such that the connection is interrupted between the cylinders of the rams 13 and 14 and a pump 26 that pumps the oil or other fluid under pressure from a reservoir, 25. The two stops 15 and 16 are then just in contact with the feelers 17 and 18.

If, now, owing to uneven, one-sided application of tension on the belt 5, the bearing 11 on the right of FIG. 5 is displaced, this will act via the stop 16, the feeler 18 and the pinion 19 to adjust the variable resistor 20, thereby giving rise to a voltage difference in relation to the normal voltage across the resistor 21. This voltage difference is supplied through the conductor 27 to a regulator 28, which, according to the polarity of this voltage difference, will change the distribution valve 24 over to either the "through" or the "vent" position. In the "through" position, the pump 26 will drive oil under pressure into the cylinder of the ram 14, so that the bearing 11 in FIG. 5 will be swung counter-clockwise.

For the voltage difference of the opposite polarity, oil from the cylinder of the ram 14 will be vented through the aperture 24a of the distribution valve 24.

I claim:
1. In a plant for carrying out a continuous finishing process on synthetic-resins, rubber and the like in laminar form,
a heating drum,
a belt-tensioning roller including
a shaft, and
bearings journalling said shaft, said bearings being arranged to permit displacements of the shaft normal to the axis thereof, and
a belt passing around the heating drum and the tensioning roller, said belt serving, in conjunction with the heating drum, to effect said finishing process, the improvement comprising
means for sensing displacement of at least one of said bearings,
means for converting the sensed displacement into an electrical signal, and
hydraulic means responsive to said electrical signal to restore the belt-tensioning roller to a predetermined alignment.

2. In a plant for carrying out a continuous finishing process on synthetic-resins, rubber and the like in laminar form,
a heating drum,
a belt tensioning roller including
a shaft, and
bearings journalling said shaft, said bearings being arranged to permit displacements of the shaft normal to the axis thereof, and
a belt passing around the heating drum and the tensioning roller, said belt serving, in conjunction with the heating drum, to affect said finishing process, the improvement comprising
two variable resistors one associated with each bearing, the moving contact of the resistor being responsive to displacement of the corresponding bearing,
control means connected to receive a voltage from the two variable resistors related to the difference between the normal voltage drop across one resistor and the actual voltage drop across the other resistor resulting from displacement of the associated bearing,
a hydraulic pressure fluid distribution valve responsive to output signals of the control means, and
two hydraulic rams, one supporting each bearing and each connected to the distribution valve, the distribution valve serving to supply hydraulic fluid to the rams whereby the alignment of the bearings is maintained.

3. A plant according to claim 2, further comprising
two feelers one being disposed to sense displacement of each bearing,
two racks each rigid with a respective feeler,
means defining an abutment surface on each bearing and arranged to contact a respective feeler, and
two pinions, each meshing with a respective rack and connected to drive the slide of the respective variable resistor.

4. A plant according to claim 2, further comprising
a support stand,
each variable resistor being mounted on the said support stand.

5. A plant according to claim 2, further comprising
two limit switches, one being associated with each variable resistor and serving to reduce the pressure to the associated hydraulic ram when an extreme position of the slide of the resistor is reached.

References Cited

UNITED STATES PATENTS

| | | |
|---|---|---|
| 2,082,895 | 6/1937 | Knowland. |
| 2,545,921 | 3/1951 | Goodwillie et al. |
| 3,214,795 | 11/1965 | Hannauer et al. |
| 3,240,148 | 3/1966 | Varga. |
| 3,273,199 | 9/1966 | Kleinewefers. |

WILLIAM J. STEPHENSON, Primary Examiner

U.S. Cl. X.R.

18—2